(12) United States Patent
Lutz et al.

(10) Patent No.: US 8,297,934 B2
(45) Date of Patent: Oct. 30, 2012

(54) GUIDE VANE ARRANGEMENT FOR A DRIVING MECHANISM

(75) Inventors: Andreas Lutz, Graz (AT); Thomas Wettemann, Wolfegg (DE)

(73) Assignee: Facc AG, Ried am Innkreis (AT)

( * ) Notice: Subject to any disclaimer, the term of this patent is extended or adjusted under 35 U.S.C. 154(b) by 564 days.

(21) Appl. No.: 12/306,955

(22) PCT Filed: Jun. 29, 2007

(86) PCT No.: PCT/AT2007/000325
§ 371 (c)(1),
(2), (4) Date: Dec. 30, 2008

(87) PCT Pub. No.: WO2008/000014
PCT Pub. Date: Jan. 3, 2008

(65) Prior Publication Data
US 2009/0317246 A1    Dec. 24, 2009

(30) Foreign Application Priority Data

Jun. 30, 2006    (AT) ................ A 1105/2006

(51) Int. Cl.
*F03B 3/12*    (2006.01)
(52) U.S. Cl. ...................................... 416/230; 415/200
(58) Field of Classification Search .................. 415/200; 416/230
See application file for complete search history.

(56) References Cited

U.S. PATENT DOCUMENTS

| 4,596,621 | A | 6/1986 | Nawaz |
| 5,083,900 | A | 1/1992 | Carletti et al. |
| 5,226,789 | A | 7/1993 | Donges |
| 5,584,654 | A | 12/1996 | Schaefer et al. |
| 5,624,618 | A | 4/1997 | Forman et al. |
| 6,196,794 | B1 * | 3/2001 | Matsumoto ................ 415/191 |
| 6,371,725 | B1 | 4/2002 | Manteiga et al. |
| 6,676,373 | B2 * | 1/2004 | Marlin et al. ................ 415/191 |
| 7,722,320 | B2 * | 5/2010 | Matsumoto et al. .......... 415/191 |
| 2002/0064456 | A1 * | 5/2002 | Marlin et al. ................ 415/191 |
| 2006/0188369 | A1 * | 8/2006 | Charier et al. .............. 415/191 |
| 2007/0224038 | A1 * | 9/2007 | Solomon et al. ............. 415/191 |
| 2009/0155050 | A1 * | 6/2009 | Broomer et al. ............. 415/115 |
| 2009/0155061 | A1 * | 6/2009 | Girard et al. ................ 415/191 |
| 2009/0162193 | A1 * | 6/2009 | Mariotti et al. ............. 415/191 |

FOREIGN PATENT DOCUMENTS

| DE | 10323132 A1 | 12/2004 |
| EP | 0513958 A2 | 11/1992 |
| EP | 1167693 B1 | 6/2006 |
| GB | 2418460 A | 3/2006 |

* cited by examiner

*Primary Examiner* — Julio J Maldonado
*Assistant Examiner* — Robert Bachner
(74) *Attorney, Agent, or Firm* — Laurence A. Greenberg; Werner H. Stemer; Ralph E. Locher

(57) ABSTRACT

The invention relates to a guide-vane arrangement (1) for deviating the flow present in the by-pass flow channel (2) of an engine (3), said arrangement comprising an outer ring (4) and an inner ring (5) and guide vanes (6) arranged therebetween in a substantially radial manner, wherein the outer ring (4) has elements (7) for connecting to an outer engine structure (8), and the inner ring (5) has elements (9) for connecting to an inner engine structure (10), with a plurality of segments (11) being provided. In order to create a guide-vane arrangement (1) which is sufficiently stable and has optimum aerodynamic properties, each segment (11) is integrally produced from at least one guide vane (6) with a part (12) of the outer ring (4) having at least two flanges (14) for fixing to the outer engine structure (8), and with a part (13) of the inner ring (5) having at least two flanges (15) for fixing to the inner engine structure (10), the segments (11) preferably being made of fiber-reinforced plastic composite material, preferably by an RTM (resin transfer molding) method.

18 Claims, 5 Drawing Sheets

GUIDE VANE ARRANGEMENT FOR A DRIVING MECHANISM

BACKGROUND OF THE INVENTION

Field of the Invention

The invention relates to a guide-vane arrangement for deviating the flow present in the by-pass flow channel of an engine, said arrangement comprising an outer ring and an inner ring and guide vanes arranged therebetween in a substantially radial manner, wherein the outer ring has elements for connecting to an outer engine structure, and the inner ring has elements for connecting to an inner engine structure, with a plurality of segments being provided.

In particular, the invention relates to jet engines as they are used with aircraft, in particular with large passenger or cargo aircraft. The engine operates according to the principle of jet propulsion, wherein the ambient air is sucked in and will be discharged as a propulsion jet. A so-called annular by-pass channel or by-pass is arranged about the engine, with part of the air flowing through this channel. This by-pass is delimited by the inner engine structure, which encloses the core engine, and by the outer engine structure. For deviating the flow within the by-pass channel, guide vanes are used, which are arranged between the inner and outer engine structures. Usually, these guide vanes are formed of metal, in particular titanium, and connected to the inner and outer engine structures.

In order to provide for the stability necessary, additional elements are usually provided between the inner and outer engine structures. These additional braces increase both the production effort and the total weight of the engine, and they deteriorate the aerodynamic quality in the by-pass.

One of the primary objects in aviation engineering is to reduce weight and to thus save fuel. This is why numerous components of an aircraft are made of plastic composite materials and not of metal. In the field of development, there is the trend to use fiber-reinforced plastic composite materials also in the structure. Also, in the field of engine structure, there is the aim to produce components from lighter fiber-reinforced plastic composite materials, thus saving weight.

U.S. Pat. No. 4,596,621 A, for example, shows a method for producing a so-called cascade made as it is known with thrust reversing mechanisms in engines, with the cascade being made of fiber-reinforced plastic composite materials. In particular with components of complex geometry, a non-automatable or partly-automatable production of the same from plastic composite materials is however not economical.

U.S. Pat. No. 5,624,618 A also describes a method for forming components of complex geometry from composite materials, wherein here, mention is also made of so-called cascades, via which the air is deviated in the opposite direction during thrust reversion. In contrast to the present guide-vane arrangement, the stability requirements imposed on the cascades of U.S. Pat. No. 5,624,618 A are not that high.

A guide-vane arrangement of the present kind is known, e.g., from EP 1 167 693 B1, wherein the guide vanes, at their ends, are provided with aerodynamic linings containing the elements for connecting to the outer and inner ring of the engine structure. Correspondingly, the fixing of the segments requires relatively high effort and has to be realized by connecting elements arranged radially.

Also in the guide-vane arrangement according to U.S. Pat. No. 5,584,654 A, the fixing of the individual segments involves a relatively high effort.

The construction according to GB 2 418 460 A shows a guide-vane arrangement characterized by a structure of particularly low density. Here, no further details are given as to the connection of the individual guide vanes with the outer and inner engine structures.

BRIEF SUMMARY OF THE INVENTION

The object of the present invention is to create a guide-vane arrangement of the present kind, which meets both the aerodynamic and static requirements, and is as light as possible. Thus, the guide-vane arrangement shall be producible in an integral manner, and, moreover, be quickly exchangeable. The disadvantages of known guide-vane arrangements shall be avoided or at least reduced.

The inventive object is achieved in that each segment is integrally produced from at least one guide vane with a part of the outer ring having at least two flanges for fixing to the outer engine structure, and with a part of the inner ring having at least two flanges for fixing to the inner engine structure. Dividing the guide-vane arrangement into a plurality of segments allows for the same to be produced in a quite simple and quick manner, irrespective of their complex geometry. At present, it would technically and economically not be possible to produce a completely integral guide-vane arrangement for a jet engine of a passenger aircraft with a dimension of several meters. By the measure that each segment is integrally produced from at least one guide vane with a part of the outer ring and with a part of the inner ring, each segment of the guide-vane arrangement fulfills its static task necessary, which is why no further braces are required between the outer and inner engine structures. In turn, this allows for a reduction of the total weight of the engine. The segments may be connected to, and correspondingly fixed to, the inner and outer engine structures in a particularly simple manner via the flanges which are preferably oriented in the peripheral direction of the engine. By integrating the flanges into the segments, the fixing elements are integrated into the guide-vane arrangement. Basically, connections between the components of the guide-vane arrangement may be omitted, but they may also be provided and/or necessary, depending on the stiffness requirement. By integrating the guide-vane arrangement into the engine, the stability necessary is achieved, and the developing engine loads can be transferred to the aircraft cell. A further advantage of dividing the guide-vane arrangement into a plurality of segments resides in that only the segment(s) affected and not the whole guide-vane arrangement has (have) to be exchanged in case of a damaged part of the guide-vane arrangement.

Advantageously, the segments are produced from fiber-reinforced plastic composite material. Compared to usual modes of construction with metal, the use of a fiber-reinforced plastic composite material allows for a significant weight reduction. Modern fiber-reinforced plastic composite materials also withstand the temperatures of from 100 to 130° C. usually present in the by-pass channel of an engine without any problems. The present guide-vane arrangement consists of pure fiber-reinforced plastic composite material and meets both its static and aerodynamic requirements.

Advantageously, the segments of the guide-vane arrangement are produced from carbon-fiber-reinforced plastics. Besides low weight, the carbon fibers also have a particularly low temperature coefficient and a particularly high weight-specific stiffness and strength.

In order to obtain sufficient strength, in particular as regards guide-vane arrangements for especially large engines, it is provided that at least a major part of the fibers of each segment is continuously arranged from the flanges of the outer ring member across the at least one guide vane to the flanges of the inner ring member by several diversions. Thus, the continuous fiber strands are diverted several times, whereby the force may be guided along the fiber strands and does not have to be transferred in an interlaminar manner. This results in a particularly high strength of the segments and the whole guide-vane arrangement, whereby additional braces between the outer engine structure and the inner engine structure can be omitted. This, in turn, leads to a lower total weight of the arrangement.

According to a further feature of the invention, reactive materials, e.g. thermoplastic filaments are sewed into, or interwoven with, the fiber-reinforced plastic composite material. This allows for particular properties, e.g. strength or impact strength, to be improved. The carbon fabric used may, e.g., be interwoven with thermoplastic filaments, and the thermoplastic material may be dissolved after the resin has been added, thus increasing impact strength.

Furthermore, sew-ups in the fiber-reinforced plastic composite material may be provided to run substantially transversely to the web direction, allowing for the interlaminar power trans-mission to be improved. Glass fibers, carbon fibers, fibers from Kevlar®, or other yarns, are suitable for being sewn up.

The segments may be produced by resin injection methods, wherein the RTM (resin transfer molding) and the VARTM (vacuum assisted RTM) methods are particularly suited. With such production methods, the dry fibers may be inserted into a closed mold, the mold may be evacuated, and the liquid resin may optionally be injected under pressure. The resin will cure due to the heat.

In order to allow for as quickly and as simple a fixing of the segments of the guide-vane arrangement to the outer and/or inner engine structures, as possible a plurality of bores is provided in the flanges for receiving bolts or the like serving as elements for connecting to the engine structures.

It is not necessary to interconnect the segments of the guide-vane arrangement. Nevertheless, it is certainly possible to provide a connection between the segments. Here, the segments may be glued to each other or be interconnected via appropriate connecting elements, e.g. bolts, screws, or the like, in a detachable manner.

In order to improve stiffness and, at the same time, to ensure as low a weight as possible, stiffening elements made of fiber-reinforced plastics may be arranged on the flanges of the segments and be integrated therewith.

In order to protect the segments of the guide-vane arrangement, coatings or protective elements may be provided on the segments.

Advantageously, these coatings or protective elements are provided on the edges of the at least one guide vane of each segment, in particular on the front edge of the guide vane, seen in respect of the air flow. These coatings or protective elements may be formed of, e.g., metal. The protective elements may be glued onto the edge, in particular onto the front edge of the at least one guide vane of each segment.

The present invention will be explained in more detail by way of the enclosed drawings. Therein:

DESCRIPTION OF THE INVENTION

Figure 1:
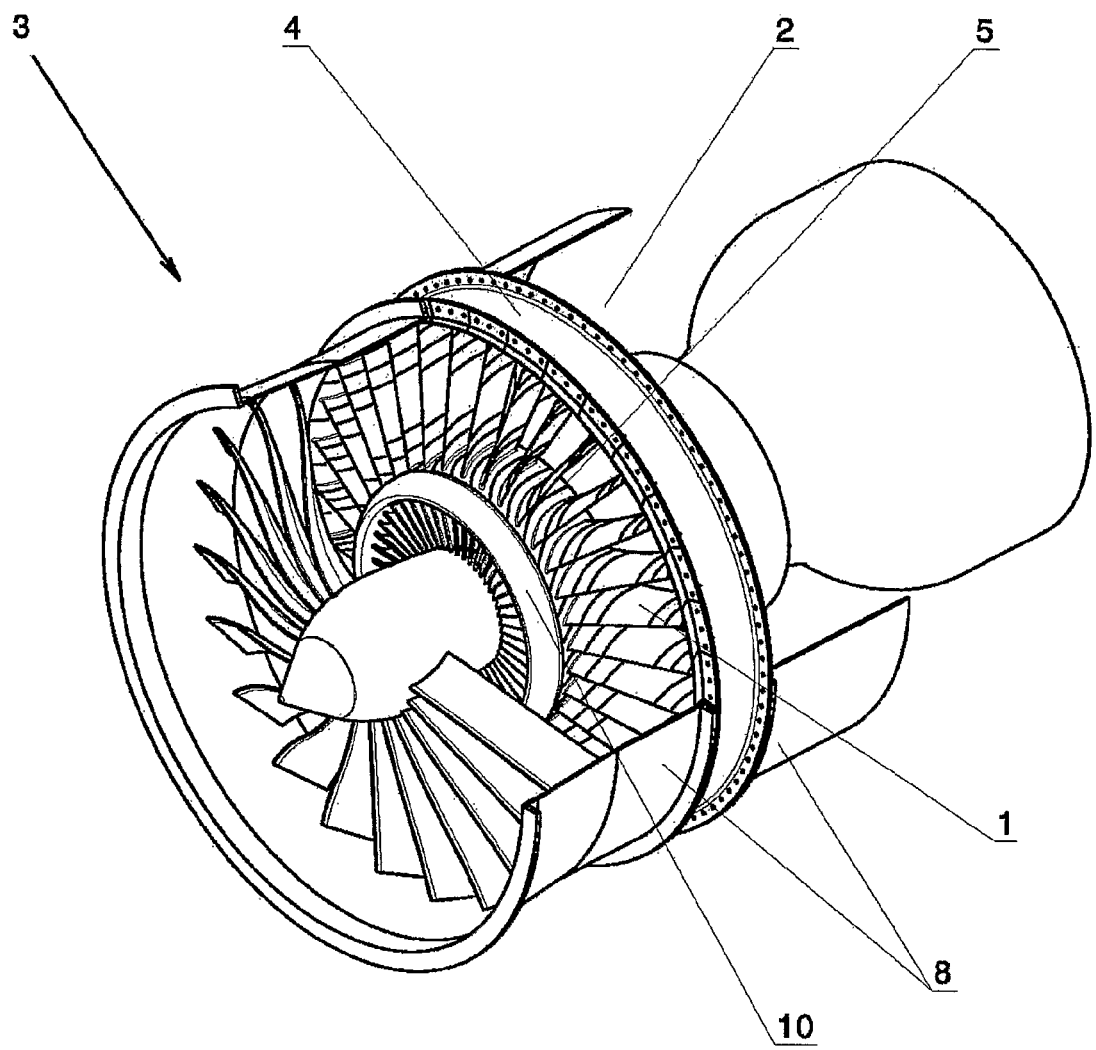
FIG. 1 shows a schematic view of an engine in sectional representation.

FIG. 1 schematically shows an engine 3 in partly sectional representation. The so-called by-pass channel 2 or by-pass is located between an outer engine structure 8 and an inner engine structure 10, with the cold part of the air flow flowing therethrough. The inner engine structure 10 encloses the core engine itself and the hot engine flow. Rotating guide vanes are provided at the front opening of the engine 3. Therebehind, the guide-vane arrangement 1 is provided which is fixed between the outer engine structure 8 and the inner engine structure 10 in a non-detachable manner. The guide vanes 6 (cf. FIG. 2) of the guide-vane arrangement 1 serve to convert the energy supplied by the rotor in the form of a higher flow rate in the peripheral direction into useful work (pressure increase, thrust). The guide-vane arrangement 1 consists of an outer ring 4 and an inner ring 5, and guide vanes 6 arranged therebetween. In order to connect the guide-vane arrangement 1 to the outer engine structure 8 and the inner engine structure 10, connecting elements 7 are arranged on the outer ring 4 of the guide-vane arrangement 1, and connecting elements 9 (cf. FIG. 2) are arranged on the inner ring 5 of the guide-vane arrangement 1. In the simplest case, these connecting elements 7, 9 may be formed by bores, through which appropriate bolts, screws or the like may be placed for connecting the guide-vane arrangement 1 to the engine structures 8, 10 (cf. FIG. 2).

Figure 2:
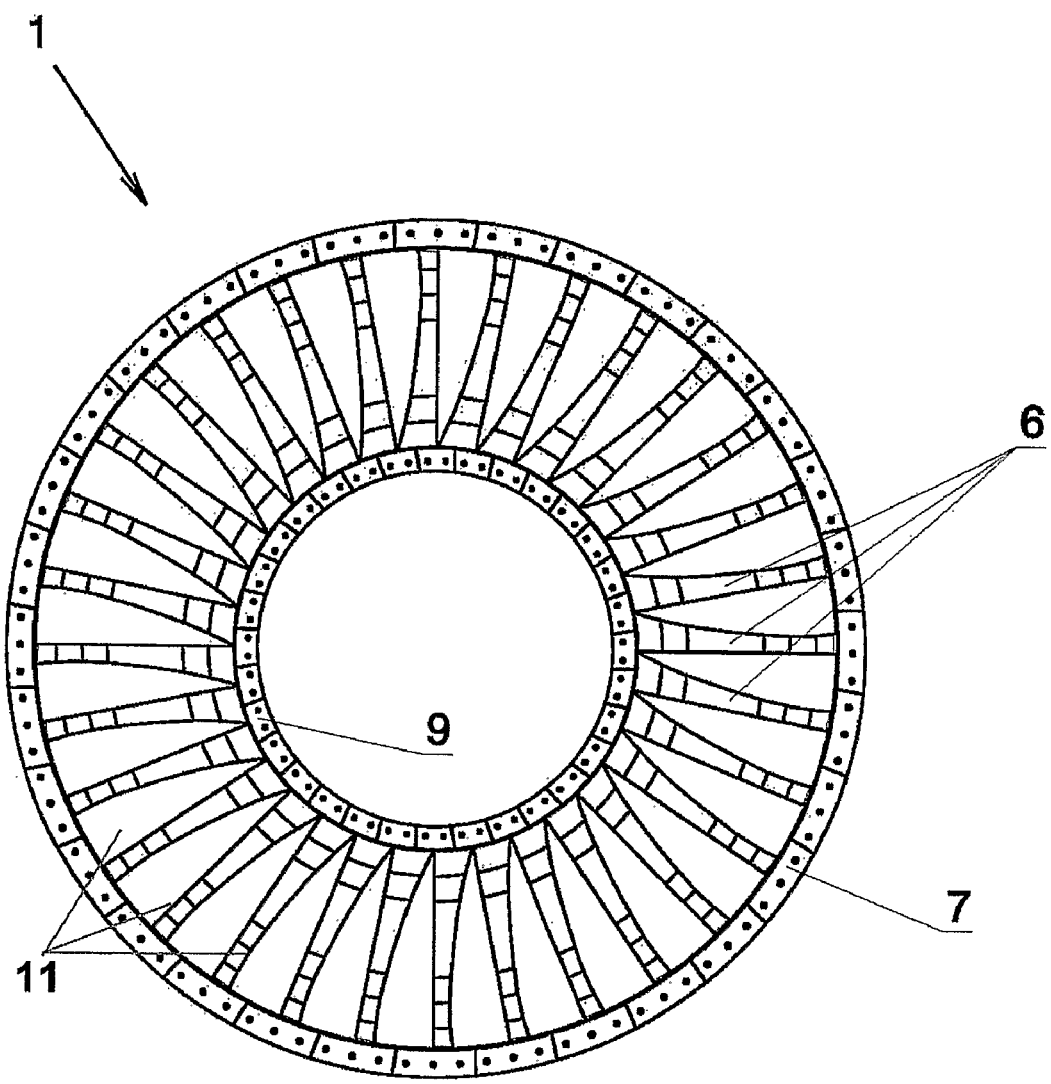
FIG. 2 shows a top view of an inventive guide-vane arrangement.

FIG. 2 shows a front view of a guide-vane arrangement 1 according to the invention. Here, the guide-vane arrangement 1 is divided into a plurality of segments 11, wherein each segment 11 is integrally produced from at least one guide vane 6 with a part 12 of the outer ring 4, and with a part 13 of the inner ring 5, the segments preferably being made of fiber-reinforced plastic composite material (cf. FIGS. 3a and 3b). The embodiment of the guide-vane arrangement 1 illustrated consists of 32 segments with one guide vane 6 each. It goes without saying that also more or fewer segments 11 may be provided and that also more than one guide vane 6 may be provided per segment 11. Nevertheless, the production of a segment 11 with two or more guide vanes 6 involves higher effort.

Figures 3A, 3B:
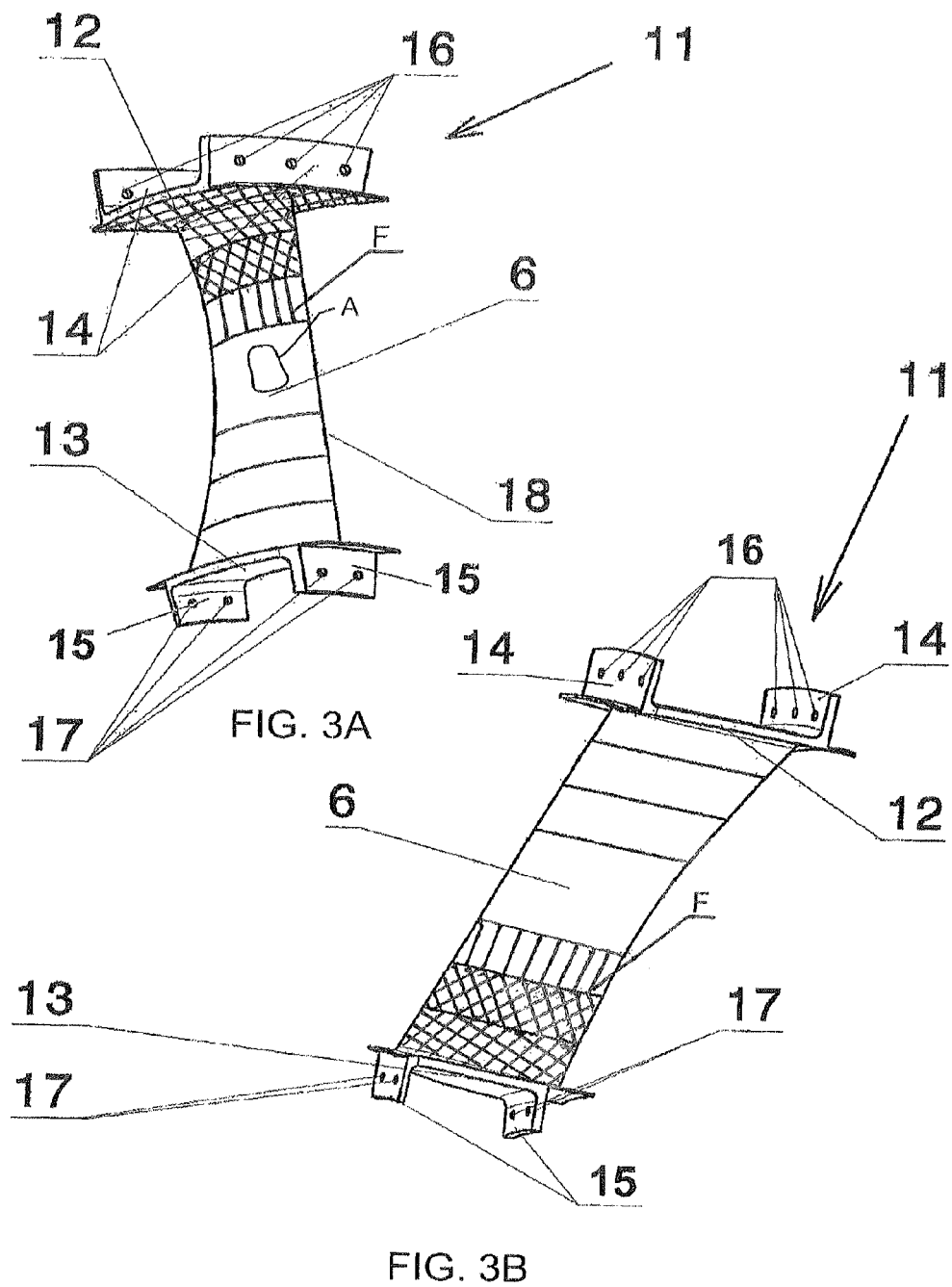
FIGS. 3a and 3b show two different perspective views of an inventive segment of a guide-vane arrangement.

FIGS. 3a and 3b show two different views of a segment 11 of a guide-vane arrangement 1. The segment 11 includes a part 12 of the outer ring 4 of the guide-vane arrangement 1 according to FIG. 2 of a guide vane 6, and a part 13 of the inner ring 5 of the guide-vane arrangement 1 according to FIG. 2. Additionally, two flanges 14, 15 each are provided both on the ring member 12 and the ring member 13, with the segment 11 being connectible to the outer engine structure 8 and the inner engine structure 10 (not illustrated) via said flanges. In order to connect the segment 11 to the engine structures 8, 10, bores 16, 17 are preferably arranged on the flanges 14, 15. These bores 16, 17 allow for appropriate bolts, screws or the like to be arranged for fixing to the corresponding structure on the engine structure 8, 10. At least a major part of the fibers F of each segment 11 is continuously arranged from the flanges 14 of the outer ring 4 across the guide vane 6 to the flanges 15 of the inner ring 5 by several diversions. Finally, a coating or protective element 19 (cf. FIG. 5) may be arranged on an edge of the guide vane 6, in particular on the front edge 18 of the guide vane 6, seen in respect of the air flow, or across a surface of the same.

Figure 4:
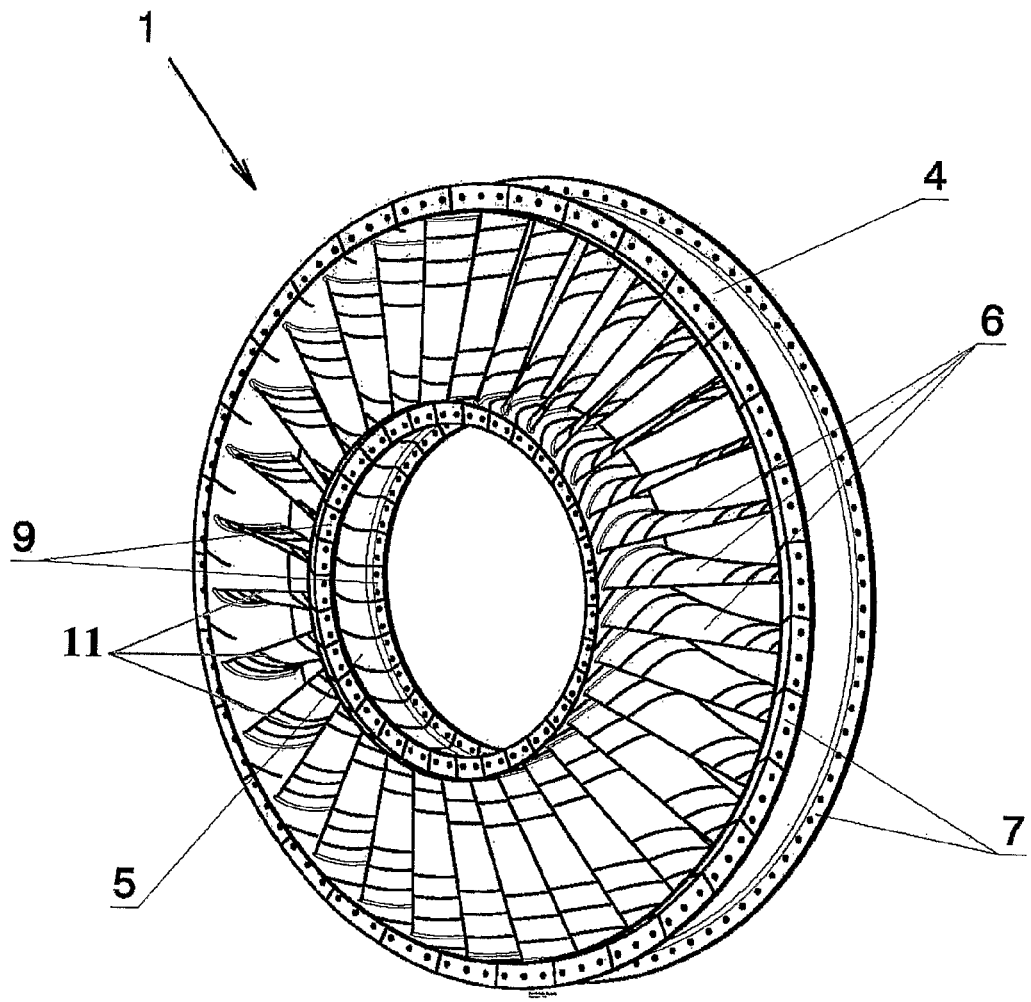
FIG. 4 shows a perspective view of an inventive guide-vane arrangement.

FIG. 4 shows a perspective view of the guide-vane arrangement 1 according to the present invention. The segments 11 of the guide-vane arrangement 1 are not necessarily interconnected, nevertheless, they may be glued to each other or interconnected via corresponding connecting elements (not illustrated) in a detachable manner.

Figure 5:
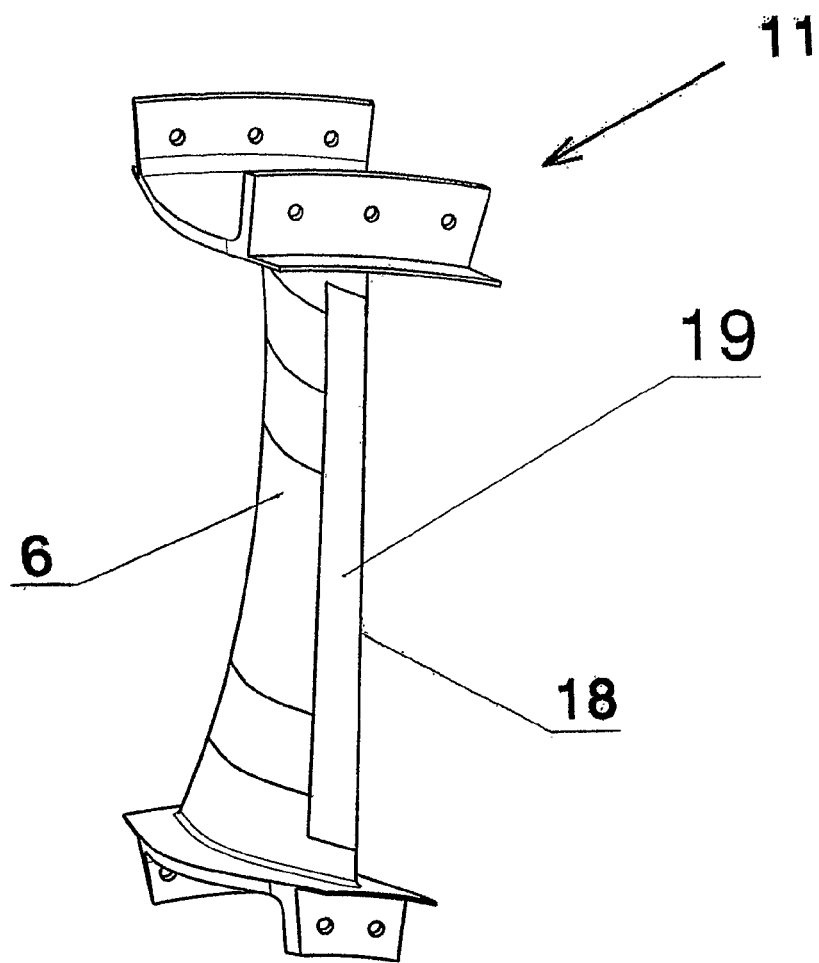
FIG. 5 shows a perspective view of a further embodiment of a segment of a guide-vane arrangement according to the present invention.
Figure 3C:
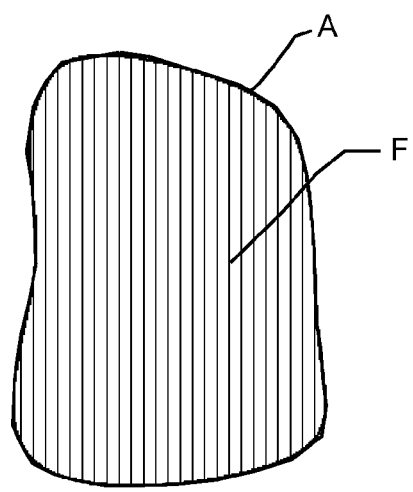
FIG. 3c shows an enlarged view of a portion "A" of segment of a guide-vane from FIG. 3A.

FIG. 5 shows a perspective view of a further embodiment of a segment 11 of a guide-vane arrangement 1, wherein a protective element 19 is arranged on, the front edge 18 of the guide vane 6, for example glued thereonto.

The inventive guide-vane arrangement, which is preferably made of pure fiber-reinforced plastic composite material, allows for low-weight engines to be produced and, since the individual segments 11 are exchangeable, to be repaired in a simpler and quicker manner.

The invention claimed is:

1. A guide-vane configuration for deflecting a flow in a bypass flow channel of an engine, the configuration comprising:
   a plurality of segments together forming an outer ring, an inner ring, and a plurality of guide vanes extending therebetween in a substantially radial direction, said segments being formed of fiber-reinforced plastic composite material;
   said plurality of segments each being formed integrally in one piece and each including:
      at least one guide vane;
      a part of said outer ring formed with at least two flanges for fixing said outer ring to an outer engine structure; and
      a part of said inner ring formed with at least two flanges for fixing said inner ring to an inner engine structure;
      continuous fiber strands disposed in said segments, at least a major portion of said continuous fiber strands in each said segment being continuously arranged from said flanges of said part of said outer ring across said at least one guide vane to said flanges of said part of said inner ring by several diversions.

2. The configuration according to claim 1, wherein said segments are formed of carbon-fiber-reinforced plastics.

3. The configuration according to claim 1, which comprises reactive materials integrated with said fiber-reinforced plastic composite material.

4. The configuration according to claim 3, wherein said reactive materials are thermoplastic filaments interwoven with said fiber-reinforced plastic composite material.

5. The configuration according to claim 1, which comprises reinforcements in said fiber-reinforced plastic composite material.

6. The configuration according to claim 1, wherein each said segment is a product of a resin injection process.

7. The configuration according to claim 6, wherein each said segment is a product of a resin transfer molding process.

8. The configuration according to claim 6, wherein each said segment is a product of a vacuum-assisted resin transfer molding process.

9. The configuration according to claim 1, wherein said flanges are formed with a plurality of bores for receiving connecting elements for mounting to the respective engine structures.

10. The configuration according to claim 1, wherein said segments are interconnected with one another.

11. The configuration according to claim 10, wherein said segments are glued to each other.

12. The configuration according to claim 10, wherein said segments are detachably interconnected to one another by way of connecting elements.

13. The configuration according to claim 1, which comprises stiffening elements of fiber-reinforced plastics formed on said flanges of said segments.

14. The configuration according to claim 1, which comprises coatings or protective elements on said segments.

15. The configuration according to claim 14, wherein said coatings are provided on edges of said at least one guide vane of each said segment.

16. The configuration according to claim 15, wherein said coatings are disposed on leading edges of said guide vanes relative to an air flow.

17. The configuration according to claim 14, wherein said protective elements are disposed on edges of said at least one guide vane of each said segment.

18. The configuration according to claim 17, wherein said protective elements are disposed on leading edges of said guide vanes relative to an air flow.

* * * * *